US005654079A

United States Patent [19]

Tutt et al.

[11] Patent Number: 5,654,079

[45] Date of Patent: Aug. 5, 1997

[54] STABILIZERS FOR CYAN DYES IN DYE-ABLATIVE ELEMENT

[75] Inventors: Lee William Tutt, Webster; Derek David Chapman, Rochester, both of N.Y.

[73] Assignee: Eastman Kodak Company, Rochester, N.Y.

[21] Appl. No.: 620,055

[22] Filed: Mar. 21, 1996

[51] Int. Cl.$^6$ .................................................. B32B 3/00

[52] U.S. Cl. ........................ 428/195; 428/913; 428/914; 503/227; 430/200; 430/201; 430/945

[58] Field of Search .................................. 428/195, 913, 428/914; 503/227; 430/200, 201, 945

[56] References Cited

U.S. PATENT DOCUMENTS

| | | | |
|---|---|---|---|
| 4,973,572 | 11/1990 | DeBoer | 503/227 |
| 5,219,823 | 6/1993 | Chapman | 503/227 |
| 5,407,719 | 4/1995 | Hamada et al. | 428/64 |

*Primary Examiner*—Patrick Ryan
*Assistant Examiner*—Elizabeth Evans
*Attorney, Agent, or Firm*—Harold E. Cole

[57] ABSTRACT

A process of forming a single color, ablation image comprising imagewise-exposing by means of a laser, in the absence of a separate receiving element, a dye-ablative recording element comprising a support having thereon a dye layer comprising a cyan image dye dispersed in a polymeric binder, the dye layer having a nitrosophenol or nitrosonaphthol ferrous complex associated therewith, the dye layer also having an infrared-absorbing material associated therewith to absorb at a given wavelength of the laser used to expose the element, the cyan image dye not having substantial absorption at the wavelength of the laser used to expose the element, the laser exposure taking place through the dye side of said element, the laser exposure taking place through the dye side of the element, thereby imagewise-heating the dye layer and causing it to ablate, and removing the ablated material to obtain an image in said ablative recording element.

12 Claims, No Drawings

STABILIZERS FOR CYAN DYES IN DYE-ABLATIVE ELEMENT

This invention relates to the use of certain stabilizers for cyan dyes in a single-sheet laser dye-ablative recording element. In particular, this invention relates to laser dye ablation to generate optical masks and monochrome transparencies used in the fields of graphic arts and medical imaging.

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to the cyan, magenta or yellow signal. The process is then repeated for the other two colors. A color hard copy is thus obtained which corresponds to the original picture viewed on a screen. Further details of this process and an apparatus for carrying it out are contained in U.S. Pat. No. 4,621,271, the disclosure of which is hereby incorporated by reference.

Another way to thermally obtain a print using the electronic signals described above is to use a laser instead Of a thermal printing head. In such a system, the donor sheet includes a material which strongly absorbs at the wavelength of the laser. When the donor is irradiated, this absorbing material converts light energy to thermal energy and transfers the heat to the dye in the immediate vicinity, thereby heating the dye to its vaporization temperature for transfer to the receiver. The absorbing material may be present in a layer beneath the dye and/or it may be admixed with the dye. The laser beam is modulated by electronic signals which are representative of the shape and color of the original image, so that each dye is heated to cause volatilization only in those areas in which its presence is required on the receiver to reconstruct the color of the original object. Further details of this process are found in GB 2,083,726A, the disclosure of which is hereby incorporated by reference.

In one ablative mode of imaging by the action of a laser beam, an element with a dye layer composition comprising an image dye, an infrared-absorbing material, and a binder coated onto a substrate is imaged from the dye side. The energy provided by the laser drives off at least the image dye at the spot where the laser beam impinges upon the element. In ablative imaging, the laser radiation causes rapid local changes in the imaging layer thereby causing the material to be ejected from the layer. This is distinguishable from other material transfer techniques in that some sort of chemical change (e.g., bond-breaking), rather than a completely physical change (e.g., melting, evaporation or sublimation), causes an almost complete transfer of the image dye rather than a partial transfer. Usefulness of such an ablative element is largely determined by the efficiency at which the imaging dye can be removed on laser exposure. The transmission Dmin value is a quantitative measure of dye clean-out: the lower its value at the recording spot, the more complete is the attained dye removal.

Laser dye ablation is useful for the making of masks for the graphic arts industry, printing plates, printed circuit boards, and for generating medical imaging monochrome transparency images. These masks are used to mask light to another material or, in the case of medical images, to mask light to the eye, and are thus subjected to prolonged exposure to light. Photostability of the dyes is therefore a primary concern.

Cyan dyes have a tendency to fade within a relatively short period of time even on modest exposure to light from a "light table", i.e., a table having fluorescent bulbs to illuminate a film through a translucent plastic. Films subjected to light from a light table for a period of one week display definite visual dye fade and a hue shift toward yellow. Since yellow is a color which provides only low visual contrast, alignment of the film then becomes more difficult.

U.S. Pat. No. 5,219,823 relates to a dye-donor element for laser-induced thermal dye transfer comprising a dye layer containing a cyanine infrared absorbing material and a nitrosonaphthol ferrous complex. However, there is no disclosure in this patent that the nitrosonaphthol ferrous complexes will specifically stabilize cyan image dyes or that such materials can be used in a laser dye-ablative process instead of a laser dye transfer process.

It is an object of this invention to provide a laser dye-ablative process which employs a stabilizer for cyan image dyes. It is another object of this invention to provide a stabilizer for cyan image dyes which is used in a dye-ablative recording element which does not contain a separate infrared-absorbing material.

These and other objects are achieved in accordance with this invention which relates to a process of forming a single color, ablation image comprising imagewise-exposing by means of a laser, in the absence of a separate receiving element, a dye-ablative recording element comprising a support having thereon a dye layer comprising a cyan image dye dispersed in a polymeric binder, the dye layer having a nitrosophenol or nitrosonaphthol ferrous complex associated therewith, the dye layer also having an infrared-absorbing material associated therewith to absorb at a given wavelength of the laser used to expose the element, the cyan image dye not having substantial absorption at the wavelength of the laser used to expose the element, the laser exposure taking place through the dye side of said element, thereby imagewise-heating the dye layer and causing it to ablate, and removing the ablated material to obtain an image in said ablative recording element.

Another embodiment of the invention relates to a dye-ablative recording element comprising a support having thereon a dye layer comprising a cyan image dye dispersed in a polymeric binder, the element not containing a separate infrared-absorbing material, the dye layer having a nitrosophenol or nitrosonaphthol ferrous complex associated therewith.

In the present invention, the nitrosophenol or nitrosonaphthol ferrous complex which is added to a dye ablation film element results in increased fade resistance to light exposure while maintaining a reasonable dye removal rate (speed) and stain elimination (low Dmin level). The complex added may be in the form of a free salt or in the form of the counterion to an infrared-absorbing dye which may be present in the element. The latter form has the advantage that less material must be removed to reach Dmin, since the mass of the counterion is reduced which has to be ablated by elimination of inactive counterions for both stabilizer and IR-absorbing dye.

Any nitrosophenol or nitrosonaphthol ferrous complex may be employed in the invention. In a preferred embodiment, the nitrosophenol or nitrosonaphthol ferrous complex has the following formula:

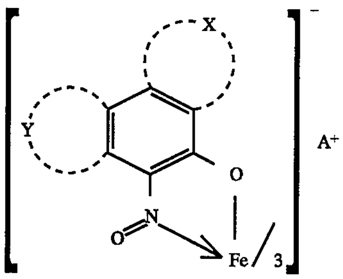

wherein:

X and Y each independently represents hydrogen, acetamido, alkyl or alkoxy of 1–4 carbon atoms, nitro, halogen or the atoms necessary to complete a fused, substituted or unsubstituted aromatic ring, with the proviso that when Y is an aromatic ring, then X can be hydrogen, acetamido, alkyl or alkoxy of 1–4 carbon atoms, nitro, or halogen; and A represents a cation, such as ammonium, tetraalkyl ammonium, an alkali metal, 1-alkyl pyridinium, etc.

In another preferred embodiment of the invention, A represents tetraalkyl ammonium, Y is hydrogen and X represents methoxy. In another preferred embodiment, A represents tetraalkyl ammonium and either X or Y represents the atoms necessary to provide a fused naphthol ring.

Following are examples of the stabilizer complexes which may be employed in the invention:

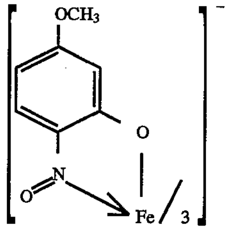

Stabilizer S-1

$^{+}N(n\text{-}C_4H_9)_4$

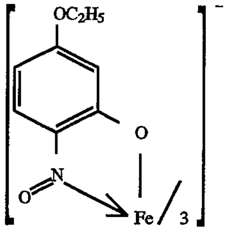

Stabilizer S-2

$^{+}N(n\text{-}C_4H_9)_4$

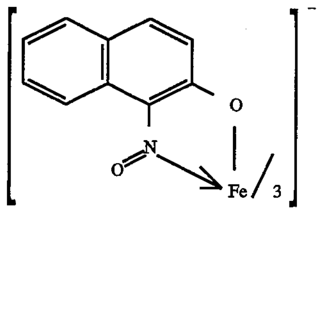

Stabilizer S-3

-continued $^{+}N(n\text{-}C_4H_9)_4$

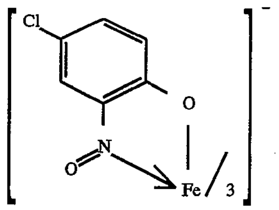

Stabilizer S-4

$^{+}N(n\text{-}C_4H_9)_4$

In a preferred embodiment of the process of the invention, the infrared absorbing material is an infrared-absorbing dye and it and the nitrosophenol or nitrosonaphthol ferrous complex are in the dye layer.

The dye layer of the dye ablation element of the invention may also contain an ultraviolet-absorbing dye, such as a benzotriazole, a substituted dicyanobutadiene, an aminodicyanobutadiene, or any of those materials disclosed in Patent Publications JP 58/62651; JP 57/38896; JP 57/132154; JP 61/109049; JP 58/17450; or DE 3,139,156, the disclosures of which are hereby incorporated by reference. They may be used in an amount of from about 0.05 to about 1.0 $g/m^2$.

The dye ablation elements of this invention can be used to obtain medical images, reprographic masks, printing masks, etc. The image obtained can be a positive or a negative image. The dye ablation or removal process can generate either continuous (photographic-like) or halftone images.

The invention is especially useful in making reprographic masks which are used in publishing and in the generation of printed circuit boards. The masks are placed over a photosensitive material, such as a printing plate, and exposed to a light source. The photosensitive material usually is activated only by certain wavelengths. For example, the photosensitive material can be a polymer which is crosslinked or hardened upon exposure to ultraviolet or blue light but is not affected by red or green light. For these photosensitive materials, the mask, which is used to block light during exposure, must absorb all wavelengths which activate the photosensitive material in the Dmax regions and absorb little in the Dmin regions. For printing plates, it is therefore important that the mask have high blue and UV Dmax. If it does not do this, the printing plate would not be developable to give regions which take up ink and regions which do not.

By use of this invention, a mask can be obtained which has enhanced stability to light for making multiple printing plates or circuit boards without mask degradation.

Any polymeric material may be used as the binder in the recording element employed in the invention. For example, there may be used cellulosic derivatives, e.g., cellulose nitrate, cellulose acetate hydrogen phthalate, cellulose acetate, cellulose acetate propionate, cellulose acetate butyrate, cellulose triacetate, a hydroxypropyl cellulose ether, an ethyl cellulose ether, etc., polycarbonates; polyurethanes; polyesters; poly(vinyl acetate); polystyrene; poly (styrene-co-acrylonitrile); a polysulfone; a poly(phenylene oxide); a poly(ethylene oxide); a poly(vinyl alcohol-co-acetal) such as poly(vinyl acetal), poly(vinyl alcohol-co-butyral) or poly(vinyl benzal); or mixtures or copolymers thereof. The binder may be used at a coverage of from about 0.1 to about 5 $g/m^2$.

In a preferred embodiment, the polymeric binder used in the recording element employed in the process of the invention has a polystyrene equivalent molecular weight of at least 100,000 as measured by size exclusion chromatography, as described in U.S. Pat. No. 5,330,876, the disclosure of which is hereby incorporated by reference.

A barrier layer may be employed in the laser ablative recording element of the invention if desired, as described in copending U.S. Ser. No. 321,282, filed Oct. 11, 1994, and entitled BARRIER LAYER FOR LASER ABLATIVE IMAGING, the disclosure of Which is hereby incorporate by reference.

To obtain a laser-induced, dye ablative image according to the invention, an infrared diode laser is preferably employed since it offers substantial advantages in terms of its small size, low cost, stability, reliability, ruggedness, and ease of modulation. In practice, before any laser can be used to heat a dye-ablative recording element, the element usually contains an infrared-absorbing material (unless the image dye absorbs at the wavelength of the laser), such as cyanine infrared-absorbing dyes as described in U.S. Pat. No. 4,973,572, separate metal layers as described in U.S. Pat. No. 5,256,506, or other materials as described in the following U.S. Pat. Nos.: 4,948,777, 4,950,640, 4,950,639, 4,948,776, 4,948,778, 4,942,141, 4,952,552, 5,036,040, and 4,912,083, the disclosures of which are hereby incorporated by reference. The laser radiation is then absorbed into the dye layer and converted to heat by a molecular process known as internal conversion. Thus, the construction of a useful dye layer will depend not only on the hue, transferability and intensity of the image dyes, but also on the ability of the dye layer to absorb the radiation and convert it to heat. The infrared-absorbing dye may be contained in the dye layer itself or in a separate layer associated therewith, i.e., above or below the dye layer. Preferably, the laser exposure in the process of the invention takes place through the dye side of the dye ablative recording element, which enables this process to be a single-sheet process, i.e., a separate receiving element is not required.

Lasers which can be used in the invention are available commercially. There can be employed, for example, Laser Model SDL-2420-H2 from Spectra Diode Labs, or Laser Model SLD 304 V/W from Sony Corp.

The dye layer of the dye-ablative recording element of the invention may be coated on the support or printed thereon by a printing technique such as a gravure process.

Any material can be used as the support for the dye-ablative recording element of the invention provided it is dimensionally stable and can withstand the heat of the laser. Such materials include polyesters such as poly(ethylene naphthalate); polysulfones; poly(ethylene terephthalate); polyamides; polycarbonates; cellulose esters such as cellulose acetate; fluorine polymers such as poly(vinylidene fluoride) or poly(tetrafluoroethylene-co-hexafluoropropylene); polyethers such as polyoxymethylene; polyacetals; polyolefins such as polystyrene, polyethylene, polypropylene or methylpentene polymers; and polyimides such as polyimide-amides and polyether-imides. The support generally has a thickness of from about 5 to about 200 μm. In a preferred embodiment, the support is transparent.

A thermal printer which uses a laser as described above to form an image on a thermal print medium is described and claimed in U.S. Pat. No. 5,168,288, the disclosure of which is hereby incorporated by reference.

Any cyan image dye can be used in the dye-ablative recording element employed in the invention provided it is transferable to the dye-receiving layer by the action of the laser. Especially Good results have been obtained with the following cyan dyes:

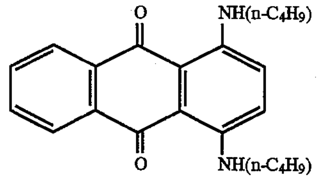

Cyan Dye 1

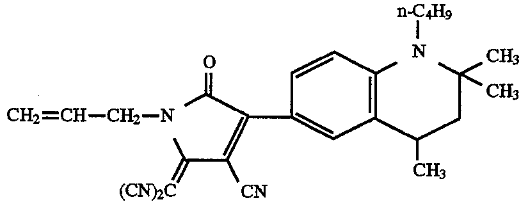

Cyan Dye 2

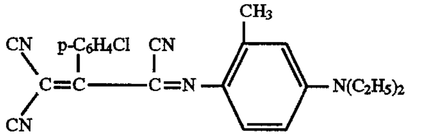

Cyan Dye 3

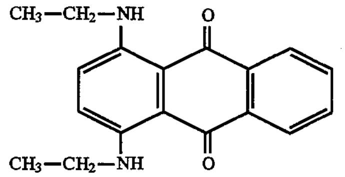

Cyan Dye 4

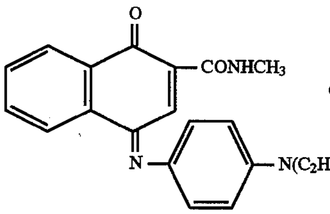

(cyan)

Cyan Dye 5

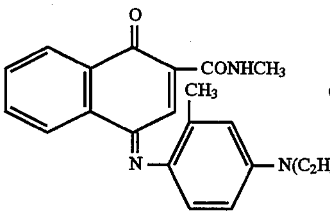

(cyan)

Cyan Dye 6 or any of the cyan dyes disclosed in U.S. Pat. Nos. 4,541,830, 4,698,651, 4,695,287, 4,701,439, 4,757,046, 4,743,582, 4,769,360, and 4,753,922, the disclosures of which are hereby incorporated by reference. The above dyes may be employed singly or in combination with other dyes. The dyes may be used at a coverage of from about 0.05 to about 1 $g/m^2$ and are preferably hydrophobic.

The following examples are provided to illustrate the invention.

EXAMPLE 1

This example demonstrates that the nitrosophenol ferrous complex can be present in the form of a counterion for the infrared-absorbing dye.

Following are the structures of the various materials used in the examples:

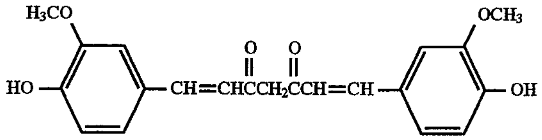

Yellow Dye

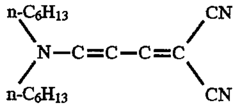

UV Dye

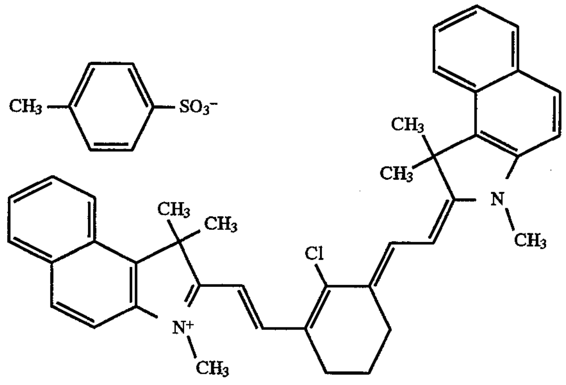

IR Dye-1
(control)

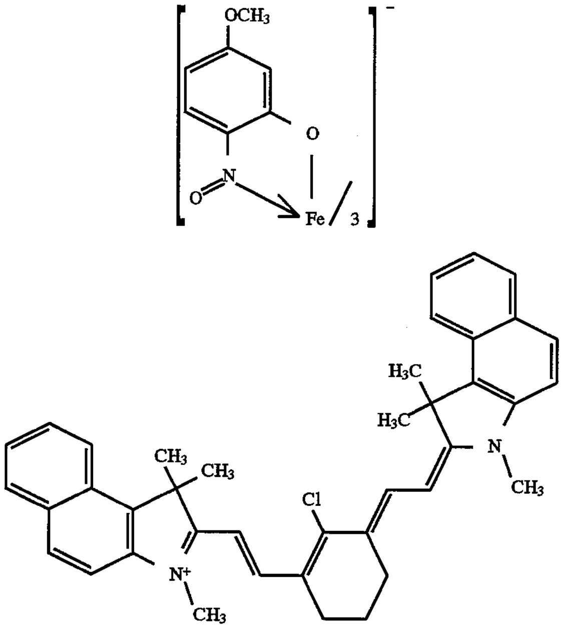

IR Dye-2 (containing nitrosophenol ferrous complex counterion)

Control elements were prepared by coating on a 100 μm poly(ethylene terephthalate) film an imaging layer of:

| | |
|---|---|
| nitrocellulose (1000–1500 sec.) | 0.604 $g/m^2$ |
| UV Dye | 0.172 $g/m^2$ |
| Yellow Dye | 0.284 $g/m^2$ |
| IR Dye-1 | 0.215 $g/m^2$ |
| Cyan Dyes 1–4 | amounts as shown in Table 1 |

-continued

The cyan dye level was varied to hold the nominal Status A red density to about 1.50 OD.

Elements according to the invention were prepared similar to the control elements except that they contained IR Dye-2 in the amount of 0.312 $g/m^2$. The infrared dye weight laydown was increased because of the counterion change to account for the increased molecular weight.

A sample of each film element was placed on a fluorescent light table for one week. The samples were positioned such that one half of each sample was protected from the light and the other half lay across the bulb region. The cyan dye fade was measured with an X-Rite Model 310 densitometer (X-Rite Corp., Grandville, Mich.) reading the Status A red absorbance. The fade was expressed as the loss of red optical density as a percent change relative to the unexposed regions. A negative number implies a gain in optical absorption. The following results were obtained:

TABLE 1

| ELEMENT CONTAINING: IR DYE/CYAN DYE ($g/m^2$) | LOSS OF RED OPTICAL DENSITY (%) |
|---|---|
| IR Dye-1 (control)/ Cyan Dye 1 (0.377 $g/m^2$) | 25 |
| IR Dye-2/ Cyan Dye 1 (0.377 $g/m^2$) | 3 |
| IR Dye-1 (control)/ Cyan Dye 2 (0.269 $g/m^2$) | 22 |
| IR Dye-2/ Cyan Dye 2 (0.269 $g/m^2$) | −2 |
| IR Dye-1 (control)/ Cyan Dye 3 (0.161 $g/m^2$) | 89 |
| IR Dye-2/ Cyan Dye 3 (0.161 $g/m^2$) | 30 |
| IR Dye-1 (control)/ Cyan Dye 4 (0.316 $g/m^2$) | 60 |
| IR Dye-2/ Cyan Dye 4 (0.316 $g/m^2$) | 3 |

The above results show that significant improvements in minimizing loss of red optical density are obtained using various cyan dyes and an infrared-absorbing dye containing a nitrosophenol ferrous complex counterion in accordance with the invention.

EXAMPLE 2

This example illustrates the beneficial effects of the addition of a stabilizer to an element which does not contain any IR-absorbing dye which is employed in a dye-ablation process using a red laser.

A Control 2 element was prepared which is similar to the control element of Example 1 containing Cyan Dye 3, but without any IR Dye-1 present. Elements according to the invention were prepared similar to Control 2 except that they contained 0.097 $g/m^2$ of stabilizers S-1, S-2, S-3 and S-4. The light fade characteristics for 5 days on a light box were measured as in Example 1. The following results were obtained:

TABLE 2

| ELEMENT CONTAINING STABILIZER | LOSS OF RED OPTICAL DENSITY (%) |
|---|---|
| none (Control 2) | 88 |
| S1 | 36 |
| S2 | 42 |
| S3 | 20 |
| S4 | 50 |

The above results show that the addition of a stabilizer to an element without any IR-absorbing dye significantly improves the light fading characteristics.

EXAMPLE 3

This example illustrates the addition of a nitrosophenol ferrous complex to an ablation element which contains an IR-absorbing dye.

Control elements of Example 1 containing Cyan dyes 1 and 3 were prepared. Elements according to the invention were prepared similar to the control elements except that they contained stabilizer S-1 (0.097 $g/m^2$). The light fade characteristics for one week on a light box were measured as in Example 1. The following results were obtained:

TABLE 3

| ELEMENT CONTAINING: CYAN DYE/STABILIZER | LOSS OF RED OPTICAL DENSITY (%) |
|---|---|
| Cyan Dye 1/ No stabilizer (control) | 22 |
| Cyan Dye 1/ Stabilizer S-1 | 6 |
| Cyan Dye 3/ No stabilizer (control) | 89 |
| Cyan Dye 3/ Stabilizer S-1 | 33 |

The above results show that adding a stabilizer as a separate salt to the ablation element significantly improves the light fading characteristics.

EXAMPLE 4

The four elements of Example 3 were laser ablated to remove all dye where the laser irradiated, using nine 700 milliwatt lasers with an average power at the focal plane of 550 milliwatts. A 53 cm drum was rotated at 1040 rev/min to give an energy of 583 $mJ/cm^2$. This resulted in an image region that was essentially cleaned out down to the base and was only 0.02 above the lowest ultraviolet Dmin achieved at higher powers.

The optical density was measured in the ultraviolet because the films were more sensitive to cleanout at ultraviolet. The ultraviolet Dmin was measured on an X-Rite Model 361T densitometer. The Status A red Dmin values were all 0.05 and the UV Dmax values were all 2.77±0.11. The following results were obtained:

TABLE 4

| ELEMENT CONTAINING: CYAN DYE/STABILIZER | UV Dmin |
|---|---|
| Cyan Dye 1/ No stabilizer (control) | 0.12 |
| Cyan Dye 1/ Stabilizer S-1 | 0.14 |
| Cyan Dye 3/ No stabilizer (control) | 0.12 |
| Cyan Dye 3/ Stabilizer S-1 | 0.15 |

The above results show a very minor change in the ultraviolet Dmin upon addition of the stabilizer. The impact on the speed (amount of light necessary to achieve Dmin) of ablation is therefore small. Thus, the addition of a stabilizer to the element does not have any appreciable adverse effects.

The invention has been described in detail with particular reference to preferred embodiments thereof, but it will be understood that variations and modifications can be effected within the spirit and scope of the invention.

What is claimed is:

1. A process of forming a single color, ablation image comprising imagewise-exposing, by means of a laser, in the absence of a separate receiving element, a dye-ablative recording element comprising a support having thereon a dye layer comprising a cyan image dye dispersed in a polymeric binder, said dye layer having a nitrosophenol or nitrosonaphthol ferrous complex associated therewith, said dye layer also having an infrared-absorbing material associated therewith to absorb at a given wavelength of said laser used to expose said element, said cyan image dye not having substantial absorption at the wavelength of said laser used to expose said element, said laser exposure taking place through the dye side of said element, thereby imagewise-heating said dye layer and causing it to ablate, and removing the ablated material to obtain an image in said ablative recording element.

2. The process of claim 1 wherein said infrared absorbing material and said nitrosophenol or nitrosonaphthol ferrous complex are in said dye layer.

3. The process of claim 1 wherein said nitrosophenol or nitrosonaphthol ferrous complex has the following formula:

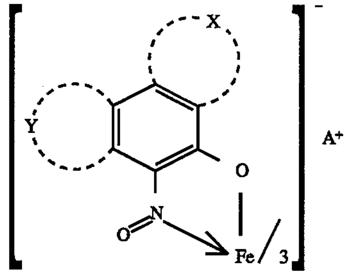

wherein:

X and Y each independently represents hydrogen, acetamido, alkyl or alkoxy of 1–4 carbon atoms, nitro, halogen or the atoms necessary to complete a fused, substituted or unsubstituted aromatic ring, with the proviso that when Y is an aromatic ring, then X can be hydrogen, acetamido, alkyl or alkoxy of 1–4 carbon atoms, nitro, or halogen; and A represents a cation.

4. The process of claim 3 wherein A represents tetraalkyl ammonium, Y is hydrogen and X represents methoxy.

5. The process of claim 3 wherein A represents tetraalkyl ammonium and either X or Y represents the atoms necessary to provide a fused naphthol ring.

6. The process of claim 1 wherein said infrared-absorbing material is a dye having a counter ion.

7. The process of claim 6 wherein said nitrosophenol or nitrosonaphthol ferrous complex is the counter ion for said infrared-absorbing dye.

8. A dye-ablative recording element comprising a support having thereon a dye layer comprising a cyan image dye dispersed in a polymeric binder, said element not containing a separate infrared-absorbing material, said dye layer having a nitrosophenol or nitrosonaphthol ferrous complex associated therewith.

9. The element of claim 8 wherein said nitrosophenol or nitrosonaphthol ferrous complex is in said dye layer.

10. The element of claim 8 wherein said nitrosophenol or nitrosonaphthol ferrous complex has the following formula:

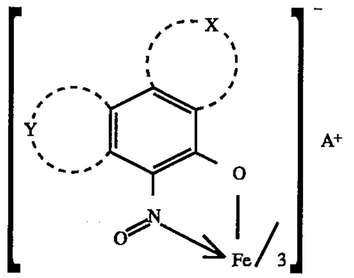

wherein:

X and Y each independently represents hydrogen, acetamido, alkyl or alkoxy of 1–4 carbon atoms, nitro, halogen or the atoms necessary to complete a fused, substituted or unsubstituted aromatic ring, with the proviso that when Y is an aromatic ring, then X can be hydrogen, acetamido, alkyl or alkoxy of 1–4 carbon atoms, nitro, or halogen; and A represents a cation.

11. The element of claim 10 wherein A represents tetraalkyl ammonium, Y is hydrogen and X represents methoxy.

12. The element of claim 10 wherein A represents tetraalkyl ammonium and either X or Y represents the atoms necessary to provide a fused naphthol ring.

* * * * *

UNITED STATES PATENT AND TRADEMARK OFFICE

CERTIFICATE OF CORRECTION

PATENT NO. : 5,654,079

DATED : August 5, 1997

INVENTOR(S) : Lee W. Tutt and Derek D. Chapman

It is certified that error appears in the above-identified patent and that said Letters Patent is hereby corrected as shown below:

On the title page, after item [22], insert --Related U.S. Application Data [60] Provisional Application Serial No. 60/001,519, filed July 26, 1995.--

In Column 1, line 3, insert --CROSS REFERENCE TO RELATED APPLICATION

Reference is made to and priority claimed from U.S. Provisional Application Serial No. US 60/001,519, filed 26 July 1995, entitled STABILIZERS FOR CYAN DYES IN DYE-ABLATIVE ELEMENT--.

Signed and Sealed this

Second Day of December, 1997

Attest:

BRUCE LEHMAN

Attesting Officer

*Commissioner of Patents and Trademarks*